US007866187B2

(12) United States Patent
Boisselle et al.

(10) Patent No.: US 7,866,187 B2
(45) Date of Patent: Jan. 11, 2011

(54) PRESS BENDING STATION FOR THE BENDING OF GLASS SHEETS

(75) Inventors: Robert J. Boisselle, Maumee, OH (US); Dieter Funk, Witten (DE); Joachim Pilz, Oer-Erkenschwick (DE); Andreas Gorges, Witten (DE)

(73) Assignees: Pilkington North America, Inc., Toledo, OH (US); Pilkington Automotive Deutschland GmbH, Witten (DE)

( * ) Notice: Subject to any disclaimer, the term of this patent is extended or adjusted under 35 U.S.C. 154(b) by 2023 days.

(21) Appl. No.: 10/669,745

(22) Filed: Sep. 24, 2003

(65) Prior Publication Data

US 2005/0061034 A1    Mar. 24, 2005

(51) Int. Cl.
  C03B 23/02    (2006.01)
  C03B 23/023   (2006.01)
  C03B 23/035   (2006.01)
  C03B 23/03    (2006.01)
(52) U.S. Cl. .......................................... 65/287; 65/106
(58) Field of Classification Search ................... 65/106, 65/107
  See application file for complete search history.

(56) References Cited

U.S. PATENT DOCUMENTS 3,595,636 A * 7/1971 Posney .......................... 65/287
4,746,348 A   5/1988 Frank
5,004,491 A * 4/1991 McMaster et al. ............. 65/106
5,139,552 A * 8/1992 Yoshizawa et al. ............ 65/273
5,376,158 A * 12/1994 Shetterly et al. .............. 65/106
5,383,947 A * 1/1995 Montonen .................... 65/25.4
5,672,189 A * 9/1997 Funk et al. .................. 65/29.19
5,833,729 A   11/1998 Meunier et al.
5,857,358 A   1/1999 DeVries, Jr. et al.
5,938,810 A   8/1999 DeVries, Jr. et al.
6,318,125 B1 * 11/2001 Diederen et al. .............. 65/102

FOREIGN PATENT DOCUMENTS

EP    0 530 211 B1    10/1993

* cited by examiner

Primary Examiner—Jason L. Lazorcik
(74) Attorney, Agent, or Firm—Marshall & Melhorn, LLC

(57) ABSTRACT

A press bending station includes an annular mold (5) and a full-face mold (6). Holes (10), selectively connected to a negative pressure source, are placed in portions of the full-face mold (6) that are determined by the configuration of the annular mold when the annular mold comes into contact with a heated glass sheet (2) during the press bending process. The sheet (2) is drawn by negative pressure through the holes (10) towards the full-face mold (6) and thus acquires its shape. Positive pressure may be selectively applied to the holes (10) to release the sheet (2). According to the invention, at least some of the holes (10) are arranged in at least one groove (11) formed in the mold face of the full-face mold. The grooves (11) according to the invention accelerate considerably the removal by negative pressure of the air between the molding face of the full-face mold (6) and the glass sheet (2) to be bent and thus improve the press bending process.

16 Claims, 5 Drawing Sheets

PRESS BENDING STATION FOR THE BENDING OF GLASS SHEETS

BACKGROUND OF THE INVENTION

The invention relates to press bending of heated materials, with opposing bending tools that are moved toward and away from each other. More particularly, the invention relates to a press bending station for the bending of heated glass sheets, with two bending tools that are moved toward one another.

Typically, in press bending, an essentially solid male mold, also known as a full-faced mold, forms one bending tool, while the other bending tool is designed as an annular or ring-type female mold. Also, in order to aid in the bending process, a plurality of suction holes are placed in portions of the full-face mold that are determined by the configuration of the annular mold when the annular mold comes into contact with a heated glass sheet during the press bending process.

As described, when a source of vacuum is applied to the male mold, the negative pressure created is transmitted through the mold via the suction holes thus causing the glass sheet, for example, an automotive laminate, such as, a windshield, or a glass sheet, such as, a side lite or a back lite (that may be tempered subsequent to bending), to be drawn to the molding face. As used herein, full-face mold denotes a bending mold against which the glass sheet lies over its full area during bending, and annular mold denotes one which supports the glass sheet only at the edge during bending.

The glass sheet to be bent is heated to the bending temperature and brought in a deformable state between the two bending tools. The latter are then moved toward one another, whereby the extensive full-face mold presses the glass sheet onto the annular mold. Shaping of the edge of the sheet thus takes place.

At the same time, the middle area of the sheet is held by vacuum against the molding face in order to perform further shaping. These procedures have to take place relatively quickly, since the glass sheet cools down rapidly and after a short time the edge area of the glass sheet falls below the bending temperature.

Various combinations of bending tools are conceivable. A combination that has been particularly well tried and tested is one in which the annular mold is curved in a concave manner, while the full-face mold has a convex curvature. The annular mold normally forms the lower mold half, and the upper mold half can be moved vertically from above and towards the latter. Instead of this, it is also possible to move the annular mold towards the full-face mold or to move both bending tools toward one another.

Following opening of, and removal from, the bending tools, the glass sheet should possess a desired shape, be dimensionally stable, and not be optically distorted. Otherwise, the bending process results in waste or products that possess poor quality.

Some of the factors that influence the quality of the products produced by the bending process are: a) attaining and maintaining the deformable state, b) positioning and slipping of the glass sheet in the molds, c) speed of execution, d) controlling mold and/or tool contact with the glass sheet or molded part, and e) contamination of bending product surfaces.

Specifically, heat gained or lost by the glass sheet throughout the press bending process can cause the glass sheet to be incorrectly bent, to crack, break, optically distort, and/or dimensionally change shape and size. Varying surface contours of the full-face mold can make it difficult for the mold to properly hold, position, prevent slippage of, and release the glass sheet during the press bending process.

A partial vacuum present at the mouths of the suction holes and slow execution of the bending process can produce in the glass sheet, as an unavoidable side-effect, local cooling zones which can impair the optical properties of the glass sheet at these points. In the case of the partial vacuum condition, the molding area of the full-face mold is kept free from suction holes. See EP 0 530 211 B1 which describes a full-face mold of the type mentioned at the outset.

Molds and bending tools contacting the heated glass sheet can also induce physical or optical distortion of the product. In addition, particulates originating from a variety of process or external sources can mar and distort the glass sheet surface during the bending process. Currently, the glass sheet to be bent is heated prior to the press bending operation, for example, in or just outside of a glass sheet preheating furnace. At times, the molds are heated by their own heat source, for example, electrically, with hot oil, air, or various other fluids. Even with these heating considerations, improvements in controlling the heating of the glass sheet could still be made.

Also, it is still difficult to consistently and properly position, hold, and release the glass sheet at the mold surfaces, and to prevent slippage of the glass sheet during the press bending process. Further, opposite mold surfaces place pressure on product viewing areas, which can result in the localized cooling that may lead to physical or optical distortion.

To minimize glass sheet surface distortion, due to process particulates being pressed between the mold and glass sheet surfaces, a second material, for example, a stainless steel cloth, has been included between the mold and the glass sheet surfaces.

However, the press bending process is still capable of improvement in respect of the bending speed, the bending accuracy, and the optical quality of the bent glass sheet produced with such molds. Thus those skilled in the art continued to seek a solution to the problem of how to provide a better press bending station for the bending of heated materials and particularly glass sheets.

SUMMARY OF THE INVENTION

The invention relates to a press bending station having at least an annular mold and a full-face mold, where holes are arranged in communication with at least one groove that is formed in the full-face mold face. As the molds are urged toward each other, heated material, typically in the form of a sheet, lies on a major surface of the annular mold and is drawn by negative pressure through the holes and groove(s) toward the full-faced mold face, where the sheet acquires its finished shape. As the molds are then urged apart, positive pressure may be applied via the holes and groove(s) to release the molded material from the full-face mold face.

Further objects and advantages of the invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

Figure 1:
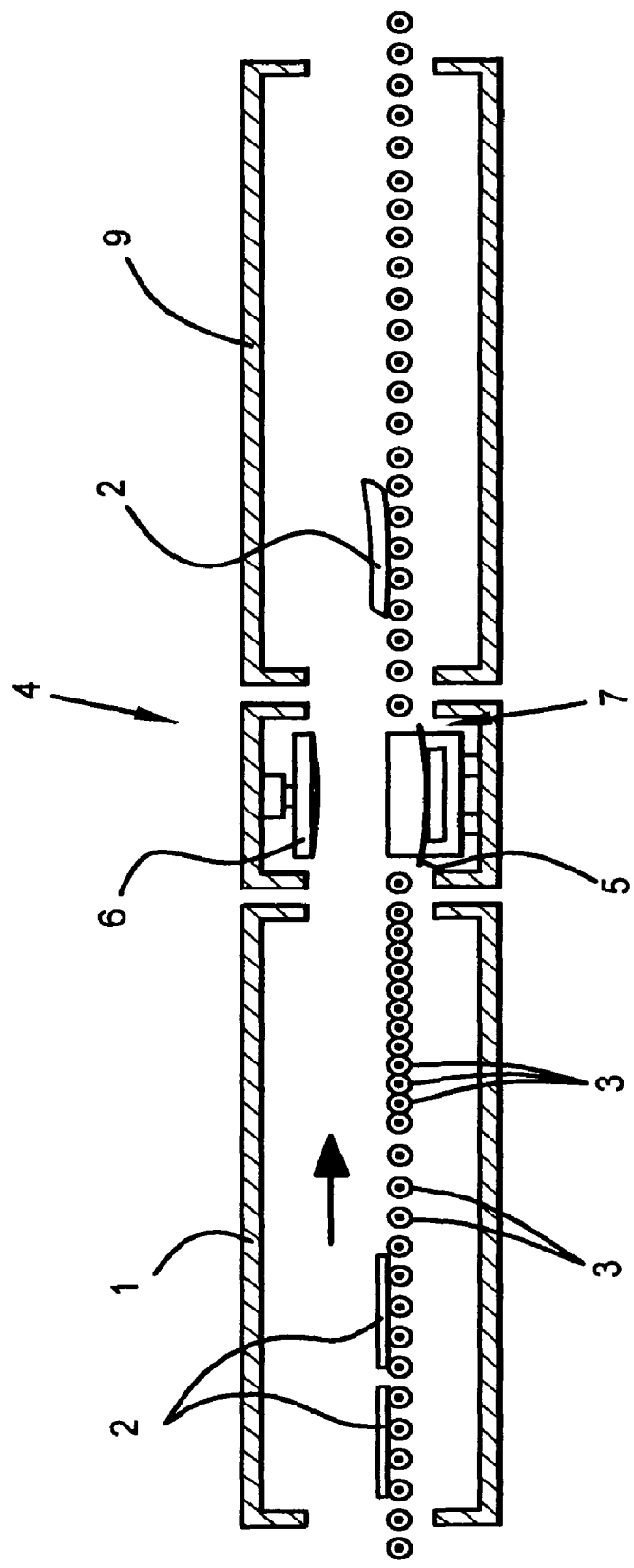
FIG. 1—in diagrammatic representation, a vertical section through a plant, into which a device according to the invention is integrated.

The invention provides a full-face mold that includes at least some holes arranged in at least one groove, which can have various cross-sectional shapes. The groove or grooves are formed in a molding face on a major surface of the full-face mold.

In addition, the holes may be connected to a source of positive or negative pressure. A particularly preferred form of the invention is characterized by the fact that a number of holes are connected together by at least one groove formed in the molding face of the full-face mold.

It has been shown that this relatively simple measure accelerates considerably the removal by negative pressure of the air between the molding face of the full-face mold and the glass sheet to be bent. The arrangement of holes in at least one groove means that a comparatively large volume of air can quickly be drawn away from the mold face, especially at the start of the removal by negative pressure, so that the glass sheet can lie substantially instantaneously next to the molding face of the full-face mold.

This ensures that the press bending process takes place as close as possible to a prescribed bending temperature, so that the residual elasticity of the glass sheet lies in the specified range, and restoring forces during the cooling of the glass sheet do not lead thereafter to an undesired deviation from the intended shape of the glass sheet. Consistent with past practice, the middle area of the extensive full-face mold, and thus of the glass sheet, preferably remains free from holes and the effects thereof, such as adversely affecting the optical quality in the viewing area of the glass sheet.

A further advantageous effect of the groove(s) provided according to the invention lies in the fact that a partial vacuum is distributed not only very quickly, but also very uniformly over the molding face of the full-face mold. This also helps to promote the accuracy of the shaping.

The positive effects of the at least one groove can be enhanced by the fact that the latter connects together as many as possible or even preferably all of the holes. In a particularly preferred arrangement, all of the holes are connected by a single peripheral groove.

It lies within the scope and spirit of the invention to provide several grooves separated from one another, for example several individual grooves connecting up with one another along the annular area predetermined by an annular mold or, if several rows of suction holes are provided, grooves formed in parallel. It is very particularly preferred, however, for all suction holes arranged in a row to be connected together by precisely one groove.

A width and depth or possibly a radius of several millimeters, preferably 4-6 mm but approximately in the range of 3-10 mm, has proved to be the most favorable cross-sectional dimensions of the groove.

As mentioned earlier, it is advantageous to keep the middle area of the molding face free from the holes, in order not to adversely affect the optics of the glass sheet. Preferably, the groove/grooves with their holes is/are arranged approximately 5 to 20 mm from the outer edge of the glass sheet. This area is generally covered with an opaque frit or paint in finished glass sheets, and any impairments of the optical quality due to the removal by negative pressure are accordingly not as visible to the observer.

The effectiveness of the arrangement according to the invention with holes arranged in at least one groove—whereby one groove preferably connects together a number of holes in each case—solely in the edge area of the extensive full-face mold, presupposes that an undisrupted and rapid removal of air by negative pressure also takes place from the middle area of the full-face mold. This can take place in different ways.

It is thus proposed as an advantageous development of the invention to provide additional flow channels in the molding face of the full-face mold inside the area enclosed by the holes. These flow channels can be connected in a radiating manner to the groove with its holes, for example in particularly critical areas with regard to bending of the glass sheet. Alternatively, such flow channels can extend as single lines or cross-linked lines, with or without connection, to one of the grooves in the molding face.

The depth and width of such flow channels lies in the range of 3-10 mm, preferably 4-6 mm, as in the case of the grooves. Through-holes are to be provided in the flow channels, through which the air enclosed by the adjacent glass sheet is able to flow away to the rear side of the mold.

In a particularly preferred development of the invention, it is proposed that the bending tools each be covered with at least one air-permeable cloth, which is preferably made of special material, for example, stainless steel, fiber glass, poly para-phenyleneterephthalamide fibers (e.g., Kevlar™), materials blended with Kevlar™, polybenzoxazole (PBO) fibers containing graphite (e.g., Zylon™), and various weaves of these fibers. The use of such air permeable cloth helps to make the distribution of the partial vacuum and thus the removal by negative pressure uniform over the glass contact faces of the bending tools.

The considerable improvement in the removal by negative pressure according to the invention by the provision of at least one groove permits the molding face of the full-face mold to be covered by only one fine mesh cloth rather than multiple layers of cloth made of wear-resistant air permeable materials. The cost saving thus arising is considerable.

Further, the invention may be practiced having the molding face of the full-face mold covered by at least two cloths lying upon the other, whereby the cloth facing the glass sheet has a finer structure than the cloth lying next to the molding face of the full-face mold. Although not wishing to be held to any theory, it is thought that this helps to spare the surface of the glass sheet and at the same time improves the distribution of the partial vacuum.

An important further favorable effect is achieved basically by the fact that the structure and the thickness of the cloth facing the glass sheet are adapted to the size of any impurity particles. Practice shows what particle size is to be expected. The structure and thickness of the cloths used is adapted accordingly. The particles are pulled into the cloths and thus prevented from causing damage to the glass surface, however small it may be.

It is further proposed that the bending tool forming the full-face mold be made of ceramic, aluminum, stainless steel, or various other composites that include fused silicas and that, like the annular mold, it be heatable electrically, with hot oil, air, or various other fluids, or in some other way. Ceramic and the above-mentioned compositions of the full-face mold create a high quality molding surface and are wear resistant.

Depending on the part produced and the molding conditions, it is at times difficult to release the part from the full-face mold at the completion of a molding cycle. The invention may address this condition by applying positive pressure to at least some of the holes. As a result, it has been found that the part is easily released from the full-face mold without physical intervention, reduction in product cycle time, or creation of quality defects.

Figure 2:
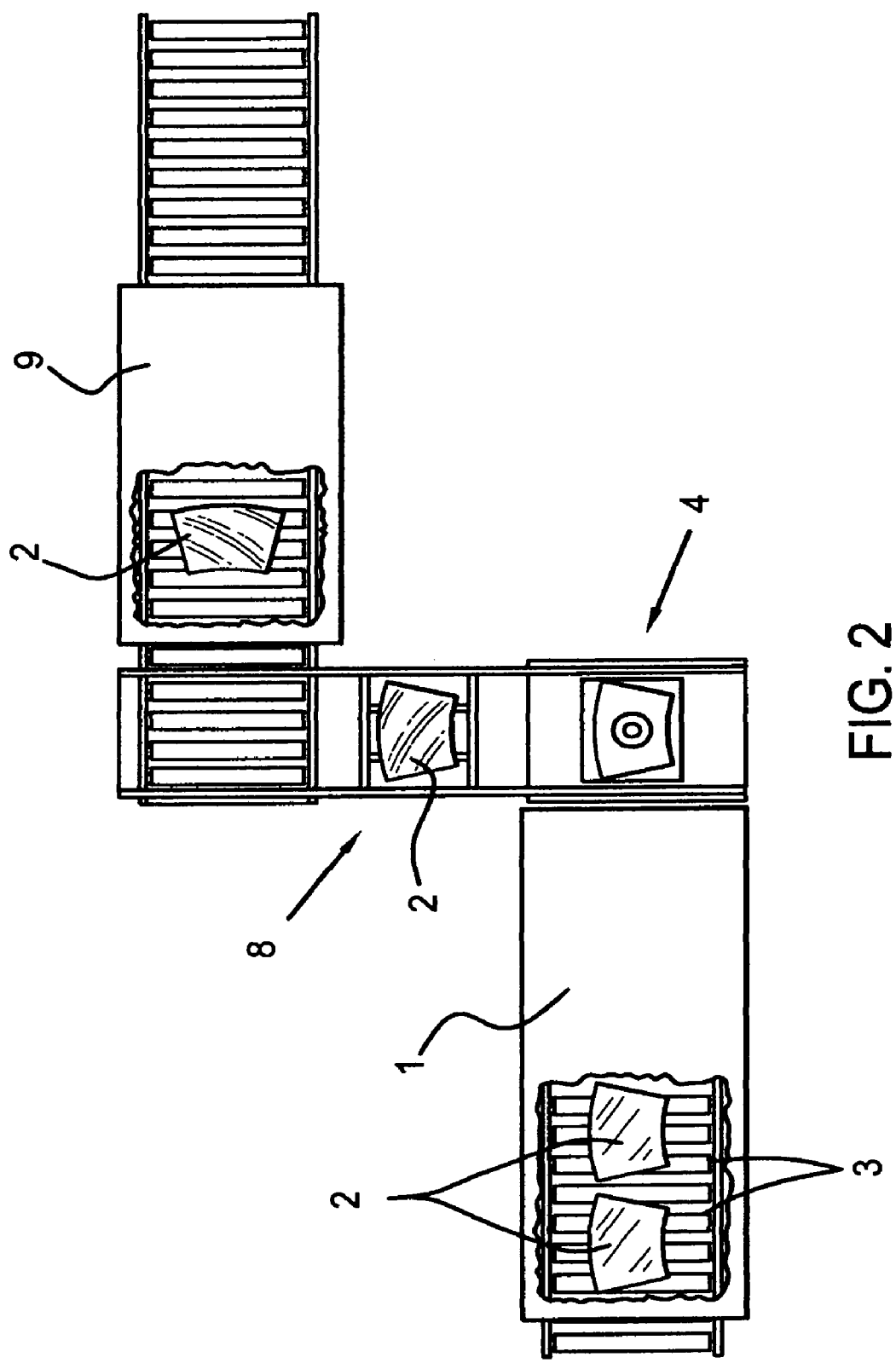
FIG. 2—a plan view of the plant according to FIG. 1.

A plant according to FIGS. 1 and 2 has a preheating furnace 1, which serves to preheat glass sheets 2 of a pair of glass sheets. Glass sheets 2 are transported on rollers 3, the spacing whereof is reduced in the area of the furnace exit, since the heated glass sheets are deformable and therefore require greater support.

Preheating furnace 1 is followed by a bending station 4, which is provided with a bending tool designed as an annular mold 5 and a bending tool designed as a full-face mold 6. It may be noted that the bending station 4 may be positioned within the preheating furnace 1. The annular mold 5 is surrounded by a chamber 7, which serves to build up a gas cushion. Glass sheets 2 are transported onto this gas cushion as soon as they exit from preheating furnace 1.

Chamber 7 is then lowered and places respective glass sheet 2 onto the annular mold 5. At the same time, the full-face mold 6 is lowered in order to draw up by negative pressure respective glass sheet 2 and to bring it into the desired shape. Upon completion of shaping the glass sheet 2, the sheet 2 may be released from the full-face mold 6 by way of positive pressure being applied through the full-face mold 6.

It may be appreciated that the press bending station may comprise more than two opposing molds 5, 6, may be oriented in a position other than vertical, have varying molds that move toward others, have varying molds that are stationary, and still be within the scope and spirit of the invention.

Upon completion of the bending process, a conveying device 8 serves to transfer bent glass sheets 2 into a lehr 9. However, the invention takes effect in the press bending station 4, in which glass sheets 2 are bent. It is necessary here to draw off as quickly as possible the air between the molding face of the full-face mold 6 traveling in the direction of the annular mold 5 for the bending of heated and still deformable glass sheet 2.

Figure 3:
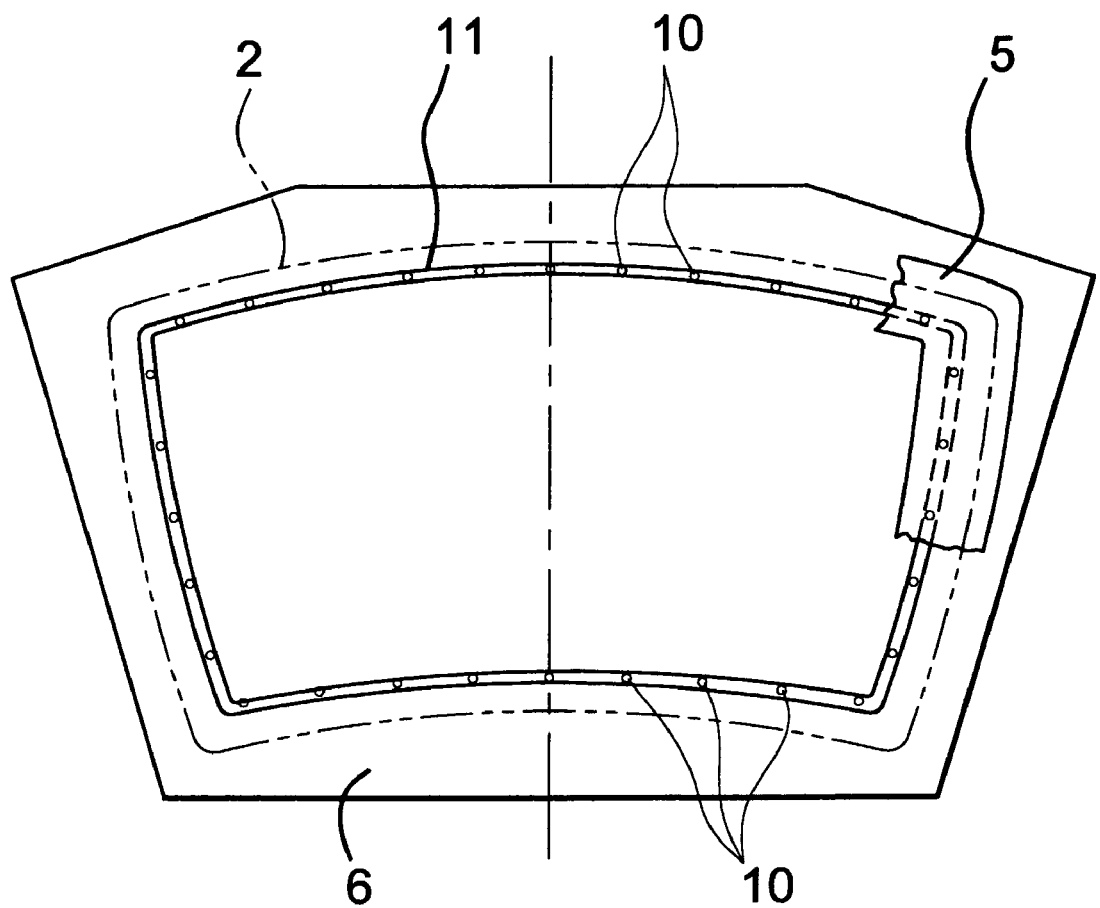
FIG. 3—a view from below of a first full-face mold according to the invention of a press bending station used in the plant according to FIGS. 1 and 2.

FIG. 3 shows a first embodiment of the full-face mold 6 according to the invention in an enlarged representation, and in plan view from below. During bending, full-face mold 6 is in molding contact with the annular mold 5 (indicated only partially and diagrammatically). Glass sheet 2 is pressed between the annular mold 5 and full-face mold 6.

In the molding face of full-face mold 6, in an area predetermined by the configuration of the annular mold 5, there is formed a plurality of holes 10, which can be connected to a negative pressure source (not shown). As a rule, the holes are connected jointly to a single negative pressure source, although a plurality of separate negative pressure sources is also quite conceivable.

Holes 10 are all connected together by a groove 11 that may take varying cross-sectional shapes, with an annular course, formed in the molding face of the full-face mold 6. Groove 11 permits rapid removal by negative pressure of the air between the molding face of the full-face mold 6 and glass sheet 2 to be bent. As mentioned, it lies within the scope and spirit of the invention to provide, instead of a single groove 11, separate such grooves in which single or several holes are respectively arranged.

Figure 4:
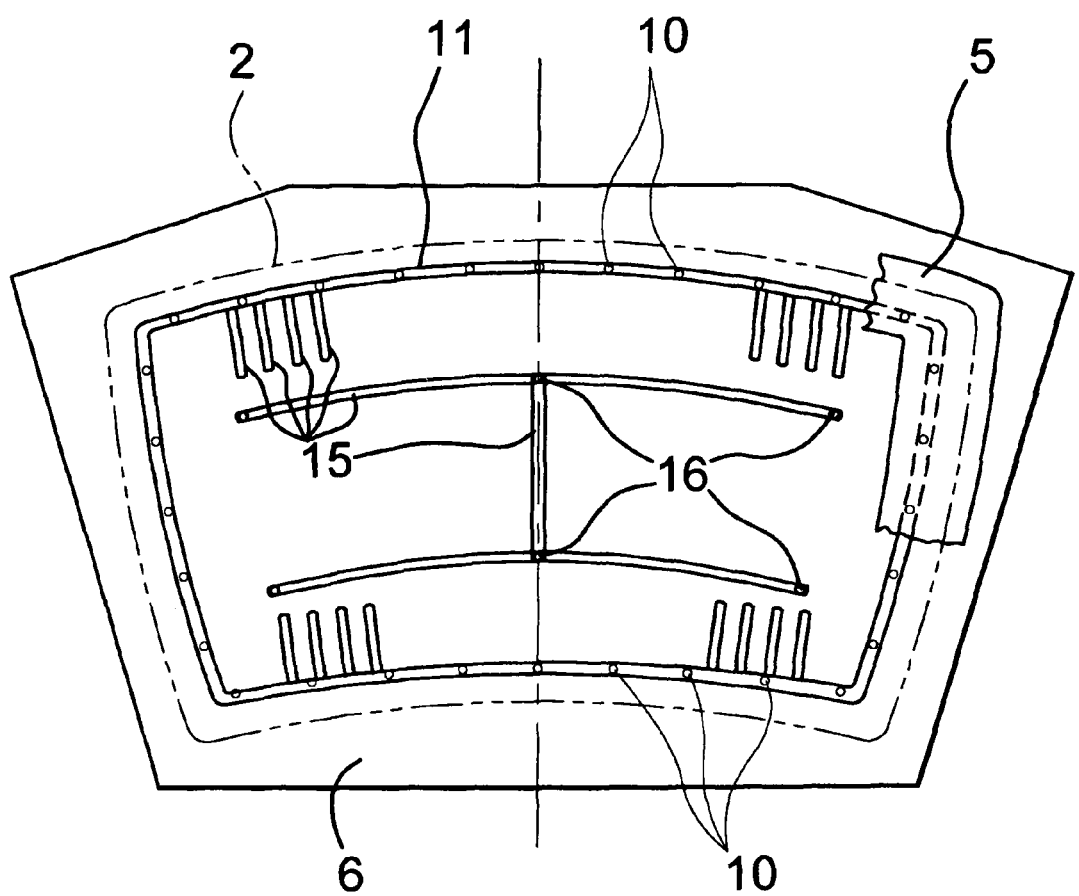
FIG. 4—a view from below of a second full-face mold according to the invention or the press bending station used in the plant according to FIGS. 1 and 2.

Another embodiment of the full-face mold 6, according to FIG. 4, has the features of the embodiment previously described in FIG. 3. In addition to groove 11, according to the invention, flow channels 15, pointing in a radiating manner to the middle of the full-face mold 6, are provided where the areas of the long sides of glass sheet 2 close to the corners, which are sometimes especially critical in bending, lie adjacent to the full-face mold 6. Said flow channels further facilitate the outflow of the enclosed air into groove 11.

Furthermore, there are, by way of example, provided in the middle area of the full-face mold 6 additional linear flow channels roughly in the shape of a horizontal H, which also cause an accelerated outflow of the air. The invention may encompass channel shapes other than that of the H shape. The shapes may be dictated by the form of the glass sheet that is to be molded on the mold face of the full-face mold 6. These flow channels 15, though being connected together, are not however connected to groove 11.

In flow channels 15 there are provided through-holes 16, through which the enclosed air can flow out via heating channels (not shown) in the full-face mold 6, without a connection to a negative pressure source being required for this.

Figure 5:
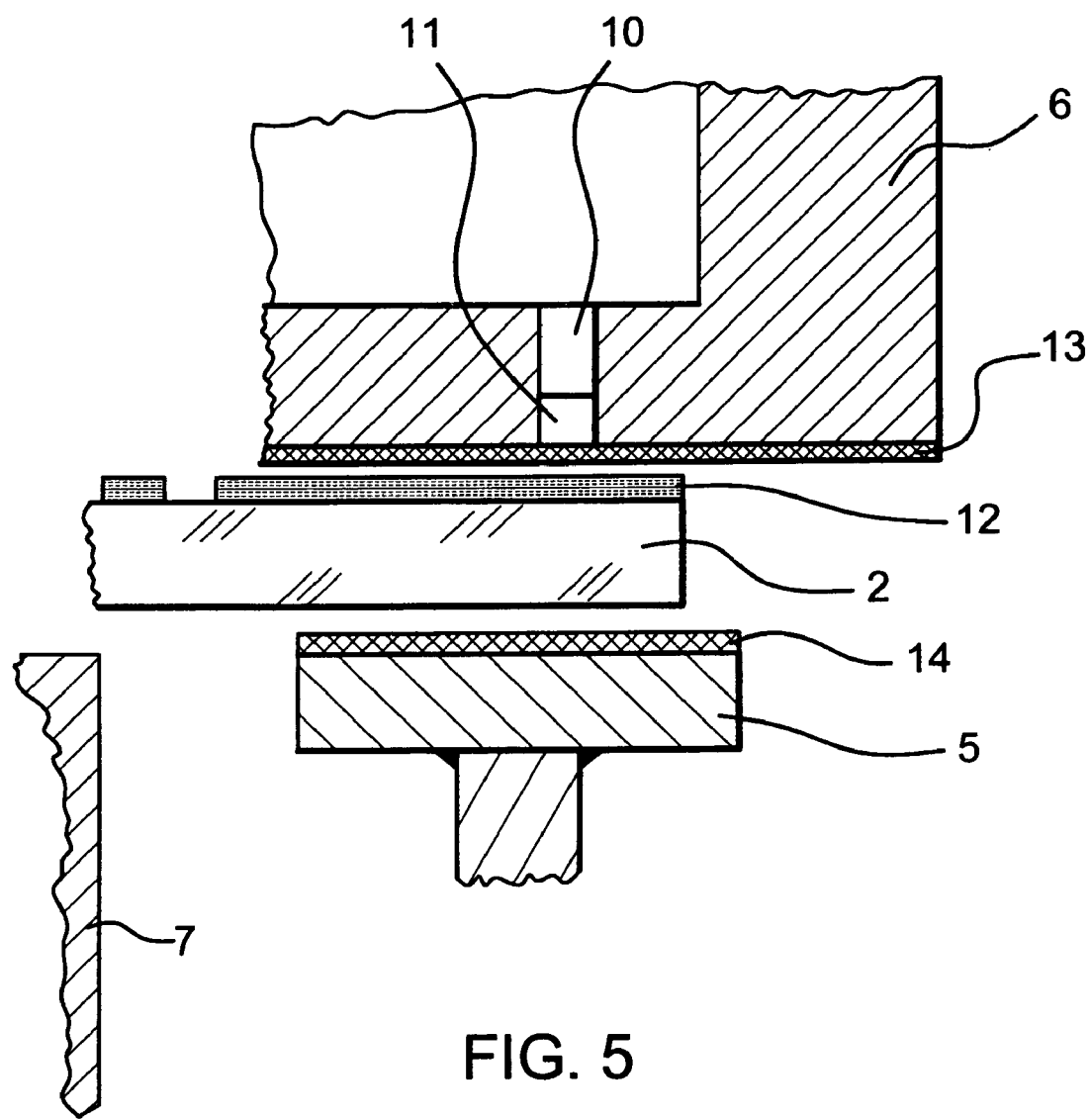
FIG. 5—a partial section through bending tools used in the press bending station.

FIG. 5 shows glass sheet 2 arranged between the full-face mold 6, the annular mold 5 and chamber 7 (only indicated here in an enlarged partial section, as a cross-sectional representation). Merely for the sake of clearer presentation, the bending tools (the annular mold 5 and the full-face mold 6) and glass sheet 2 have a small distance between one another in FIG. 5, whereas bending tools 5, 6 actually press glass sheet 2 between them during bending.

Glass sheet 2 is provided on its upper side with a standard black screen-printed edge strip 12, having an equally standard fading dot pattern (merely indicated in FIG. 5 as a single dark rectangle to the left of strip 12) in the direction of the sheet center. It can be seen in FIG. 5 that groove 11, shown roughly square in cross-section, but not limited thereto, with a width and depth of preferably approximately 4-6 mm, but within the range of 3-10 mm, respectively, is arranged in the full-face mold 6 at a small distance, preferably approximately 5-20 mm, from the outer edge of glass sheet 2.

The groove 11 construction, as described, is such that any optical defects originating from groove 11, or more precisely holes 10, are covered by screen-printed edge strip 12. Holes 10 lead into a hollow extraction chamber selectively connected to the negative pressure source, for drawing of the sheet 2 against the molding surface of the full-face mold 6, or to the positive pressure source, for release of the sheet 2 from the full-face mold 6, which is indicated only diagrammatically in the FIG. 5.

The annular mold 5, like the full-face mold 6, projects slightly beyond the edge of glass sheet 2. According to a preferred form of embodiment of the invention, both bending tools 5, 6 are respectively covered by air-permeable cloths 14 and 13.

Cloth 13 of the full-face mold 6 also contributes towards the air being able to be removed by negative pressure from the central area of the full-face mold 6 rapidly and uniformly via groove 11 and holes 10. The structure and thickness of cloths 13 and 14 are dimensioned such that impurity particles, for example, glass splinters, can be picked up in order to avoid damage to the surface of glass sheet 2.

As already described, glass sheet 2 acquires its final shape by means of the press bending—apart from any elastic recovery caused by elastic restoring forces after the release from bending tools 5, 6. On account of the rapid cooling, it is necessary for glass sheet 2 to conform as quickly as possible to the molding face of the full-face mold 6. This is ensured by the measures according to the invention.

Upon completion of the molding cycle, positive pressure can be applied to the holes for release of the molded part. This reduces the need for physical intervention to release the part from the full-face mold which improves the quality of the parts produced.

Whereas a large number of holes, on the order of 500, are required with conventional full-face molds in order to guarantee that the glass sheet would rapidly lie next to the full-face mold, the number of holes 10 required can be drastically reduced by the at least one groove 11 according to the invention.

Qualitatively excellent results have been achieved even with only approximately 40-80 holes 10 arranged inside a groove 11. The cost saving due to having to form fewer holes in the full-face mold means a considerable financial benefit due to reduced production outlay on the full-face mold 6.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A press bending station for the bending of glass sheets, comprising:
    a full-face mold having a mold face, the mold face having at least one peripheral annular groove formed in the surface thereof, the at least one peripheral annular groove having a plurality of holes located therein; and
    an annular mold;
    wherein, the at least one peripheral annular groove is formed in a peripheral area that corresponds to the molding contact area where a glass sheet is pressed between the full-face mold and the annular mold.

2. The press bending station of claim 1, wherein the holes are selectively connected to a negative pressure source.

3. The press bending station of claim 1, wherein the holes are selectively connected to a positive pressure source.

4. The press bending station of claim 1, wherein several holes are connected together by the at least one peripheral annular groove formed in the surface of the molding face of the full-face mold.

5. The press bending station of claim 4, wherein the at least one peripheral annular groove is arranged approximately 5-20 mm from the outer edge of the glass sheet.

6. The press bending station of claim 5, wherein the depth and width of the at least one peripheral annular groove are both in the range of 4-6 mm respectively.

7. The press bending station of claim 6, wherein additional flow channels and through-holes are provided in the molding face of the full-face mold inside the area enclosed by the at least one peripheral annular groove.

8. The press bending station of claim 7, wherein the bending tools are each covered by at least one air-permeable cloth.

9. The press bending station of claim 8, wherein the permeable cloth is chosen from a group of materials including stainless steel, fiber glass, poly para-phenyleneterephthalamide fibers, polybenzoxazole, graphite fibers, or blended weaves thereof.

10. The press bending station of claim 8, wherein the molding face of the full-face mold is covered by two or more cloths lying one upon the other, whereby the cloth facing the glass sheet has a finer structure than the cloth lying next to the molding face of the full-face mold.

11. The press bending station of claim 8, wherein the molding face of the full-face mold is covered by only one cloth.

12. The press bending station of claim 11, wherein the structure and the thickness of the cloth facing the glass sheet is adapted to the size of any impurity particles.

13. The press bending station of claim 12, wherein the full-face mold is chosen from the group consisting of ceramic, aluminum, stainless steel, compositions that include fused silicas, or combinations thereof.

14. The press bending station of claim 8, wherein the bending tools can be heated electrically, with hot oil, air, or other fluids.

15. A press bending station having two opposing molds, the first mold having a major surface with at least one peripheral annular groove thereon, at least one hole defined therein, the hole being disposed in fluid communication with the at least one peripheral annular groove and selectively connected to a negative pressure source for holding material to the surface, thus allowing the material to be shaped into a part when the molds are urged together.

16. The mold of claim 15, wherein the hole is selectively connected to a positive pressure source for releasing the material from the surface.

* * * * *